US 8,515,441 B1
Aug. 20, 2013

(12) United States Patent
Oroskar

(10) Patent No.: US 8,515,441 B1
(45) Date of Patent: Aug. 20, 2013

(54) DELAYING TRAFFIC CHANNEL ASSIGNMENT BASED ON RECEIVED SIGNAL QUALITY AND WIRELESS COMMUNICATION DEVICE MOTION

(75) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 286 days.

(21) Appl. No.: 13/074,376

(22) Filed: Mar. 29, 2011

(51) Int. Cl.
*H04W 72/00* (2009.01)

(52) U.S. Cl.
USPC ........... 455/450; 455/411; 455/466; 455/566; 455/456.3; 370/394; 370/473; 370/474

(58) Field of Classification Search
USPC .................. 455/456.1, 442, 501, 500, 562.1, 455/441, 69, 522, 466, 456.3, 411; 370/252, 370/338, 334, 331, 332, 335, 394, 473, 474
See application file for complete search history.

(56) References Cited

U.S. PATENT DOCUMENTS

| 5,978,463 | A | 11/1999 | Jurkevics et al. |
| 6,185,421 | B1 | 2/2001 | Alperovich et al. |
| 6,223,042 | B1 | 4/2001 | Raffel |
| 6,289,227 | B1 | 9/2001 | Shi |
| 6,963,750 | B1 | 11/2005 | Cheng et al. |
| 7,317,706 | B1 | 1/2008 | Hao et al. |
| 2001/0034233 | A1 | 10/2001 | Tiedemann, Jr. et al. |
| 2004/0002340 | A1 | 1/2004 | Lim et al. |
| 2004/0252669 | A1 | 12/2004 | Hosein |
| 2005/0164718 | A1 | 7/2005 | Rajkotia et al. |
| 2007/0232330 | A1 | 10/2007 | Ranganathan |
| 2007/0258408 | A1* | 11/2007 | Alizadeh-Shabdiz et al. ............... 370/331 |
| 2008/0056201 | A1* | 3/2008 | Bennett .................. 370/334 |
| 2009/0061854 | A1 | 3/2009 | Gillot et al. |
| 2009/0247137 | A1 | 10/2009 | Awad |
| 2012/0100872 | A1* | 4/2012 | Alizadeh-Shabdiz et al. ............... 455/456.1 |
| 2012/0129545 | A1* | 5/2012 | Hodis et al. ............... 455/456.1 |

FOREIGN PATENT DOCUMENTS

WO  WO 01/47287  6/2001

OTHER PUBLICATIONS

U.S. Appl. No. 11/499,518, filed Aug. 4, 2006.
TIA Standard, "Interoperability Test Specification for cdma2000® Air Interface," TIA-1036, Section 3.11, Jan. 2005.
TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001.

* cited by examiner

*Primary Examiner* — Joseph Arevalo

(57) ABSTRACT

A radio access network (RAN) may assign a wireless channel from a wireless coverage area to a wireless communication device (WCD) by transmitting a channel assignment message to the WCD. In situations where transmitting the channel assignment message is likely to cause the channel assignment message to be lost or damaged, the RAN may delay transmission of the channel assignment message or refrain from transmitting the channel assignment message. For example, if the WCD is receiving signals from the RAN with a poor signal strength, the RAN may wait until the WCD has had an opportunity to improve its coverage before transmitting the channel assignment message.

18 Claims, 7 Drawing Sheets

US 8,515,441 B1

DELAYING TRAFFIC CHANNEL ASSIGNMENT BASED ON RECEIVED SIGNAL QUALITY AND WIRELESS COMMUNICATION DEVICE MOTION

BACKGROUND

When assigning a traffic channel to a wireless communication device (WCD), a radio access network (RAN) may transmit one or more channel assignment messages to the WCD. Each of these channel assignment messages may be transmitted at approximately the same time via a different wireless coverage area. In this way, the probability that the WCD receives at least one channel assignment message is increased. However, channel assignment messages transmitted via a wireless coverage area from which the WCD receives poor coverage may be lost or damaged in transit.

OVERVIEW

Methods and corresponding apparatuses for transmission of channel assignment messages based on WCD motion are presented. In situations where transmitting a channel assignment message is likely to cause the channel assignment message to be lost or damaged, a RAN may refrain from transmitting the channel assignment message until the WCD has had an opportunity to move to a new location that potentially provides the WCD with better coverage.

Thus, for example, a RAN may determine that the WCD is experiencing poor coverage (e.g., low signal strength) from a given wireless coverage area. However, the RAN may also determine that the WCD is in motion, perhaps at a particular velocity. Therefore, the RAN may wait some period of time (e.g., a few tens of milliseconds to a few seconds) before transmitting the channel assignment message via the given wireless coverage area. This delay may provide the WCD with enough time to move to a different point within the given wireless coverage area that has better coverage (e.g., a higher signal strength). Alternatively, if the WCD instead moves outside of the wireless coverage area, or at least to a point that provides the same or poorer coverage, the RAN may refrain from transmitting the channel assignment message altogether. In this latter case, the RAN saves signaling channel resources by not transmitting a message that would be unlikely to reach the WCD.

Accordingly, in a first example embodiment, a RAN may obtain a signal quality measurement that indicates a strength at which a WCD receives signals from the RAN. The RAN may also determine that a channel assignment message is to be transmitted to the WCD. In response to determining that the channel assignment message is to be transmitted to the WCD, the RAN may determine whether the signal quality measurement meets a given signal quality threshold and whether the WCD is substantially in motion. If the signal quality measurement does not meet the given signal quality threshold and the WCD is substantially in motion, the RAN may wait a period of time before transmitting the channel assignment message to the WCD.

In a second example embodiment, a RAN may obtain a signal quality measurement that indicates a strength at which a WCD receives signals from the RAN. The RAN may also determine that a channel assignment message is to be transmitted to the WCD. In response to determining that the channel assignment message is to be transmitted to the WCD, the RAN may further determine whether the signal quality measurement meets a given signal quality threshold and the WCD is substantially in motion. If the signal quality measurement does not meet the given signal quality threshold and the WCD is substantially in motion, the RAN may wait a period of time. After the period of time has elapsed, the RAN may obtain a second signal quality measurement that indicates a second strength at which the WCD receives signals from the RAN. If the second signal quality measurement meets the given signal quality threshold, the RAN may transmit the channel assignment message to the WCD. On the other hand, if the second signal quality measurement does not meet the given signal quality threshold, the RAN may refrain from transmitting the channel assignment message to the WCD.

Each of these embodiments may be carried out by the RAN on a per-wireless-coverage-area basis. In other words, the RAN may determine, independently for each wireless coverage area, whether to delay a channel assignment message transmitted via that wireless coverage area. Alternatively, the RAN may condition this determination on whether channel assignment messages were transmitted without delay in other wireless coverage areas. For instance, if the RAN is communicating with a WCD via just one wireless coverage area, the RAN may transmit channel assignment messages to the WCD via that wireless coverage area without delay regardless of the coverage quality the WCD receives from that wireless coverage area. However, suppose that the RAN is communicating with the WCD via two or more wireless coverage areas. If the RAN transmits a channel assignment message to the WCD without delay via at least one of these wireless coverage areas, the RAN may delay channel assignment message transmissions to the WCD via one or more of the other wireless coverage areas in accordance with the above embodiments.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Network Architecture

Figure 1:
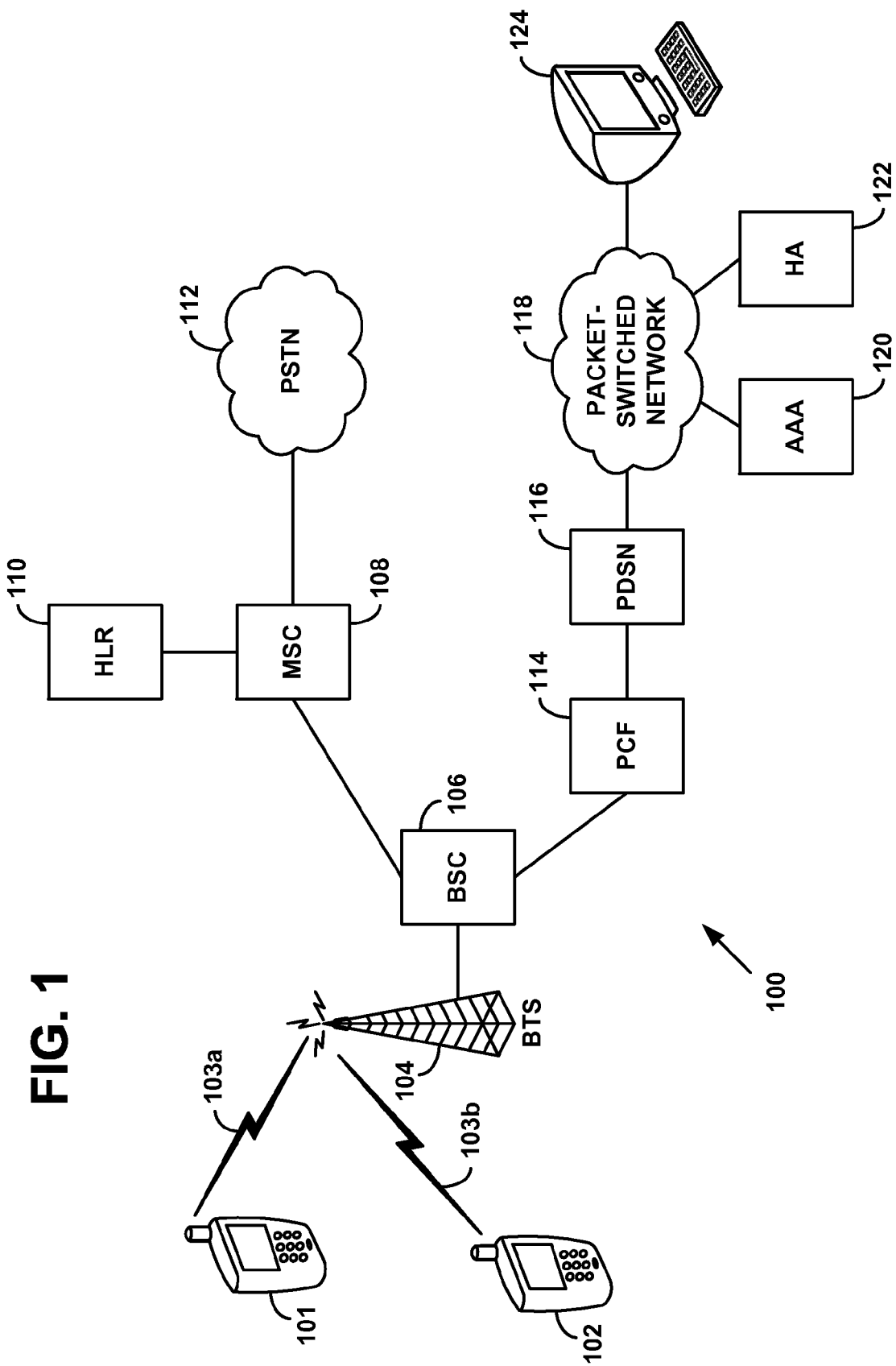
FIG. 1 depicts a RAN, in accordance with an example embodiment.

FIG. 1 is a simplified block diagram of a wireless communication system 100 in which example embodiments of delaying traffic channel assignment based on received signal quality and wireless communication device motion can be employed. WCD 101 may communicate over an air interface 103a with a base transceiver station (BTS) 104, which is, in turn, coupled to or integrated with a base station controller (BSC) 106. Similarly, WCD 102 may communicate over an air interface 103b with BTS 104. The air interface 103a from BTS 104 to WCD 101 and the air interface 103b from BTS 104 to WCD 102 may represent "forward links" to the WCDs. Conversely, the air interface 103a from WCD 101 to BTS 104 and the air interface 103b from WCD 102 to BTS 104 may represent "reverse links" from the WCDs.

BSC 106 may be connected to a mobile switching center (MSC) 108. BSC 106, MSC 108, or both, may act to control assignment of air interface traffic channels, and may provide access to wireless circuit-switched services such as circuit-voice and circuit-data services. As represented by its connection to public-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a Mobile Internet Protocol (mobile-IP) home agent (HA) 122, and a remote computer 124.

After acquiring a traffic channel over air interface 103a, WCD 101 may transmit a request to PDSN 116 for a connection to the packet data network. Then, following authentication of WCD 101 by AAA server 120, WCD 101 may be assigned an IP address by the PDSN or by HA 122, and may thereafter engage in packet-data communications with entities such as remote computer 124. Similar procedures may take place, via air interface 103b, for WCD 102.

Figure 2:
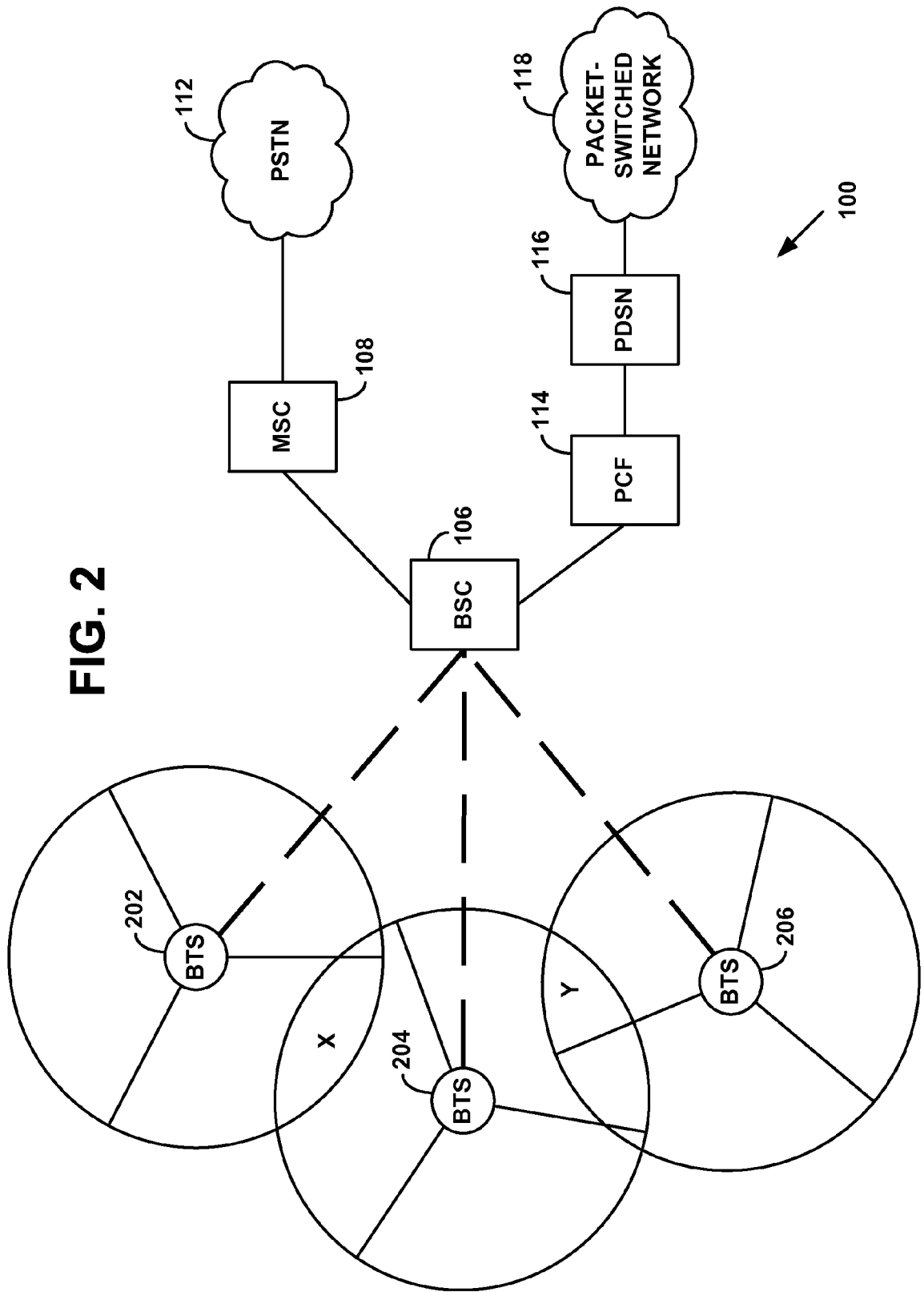
FIG. 2 depicts a RAN with several wireless coverage areas, in accordance with an example embodiment.

In practice, a BSC may serve multiple BTSs, each of which may define one or more wireless coverage areas. An example of such an arrangement is illustrated in FIG. 2, which shows BSC 106 in network 100 coupled with BTSs 202, 204, and 206. Each BTS is shown at the core of a respective circle representing wireless coverage, with each circle divided into three pie-shaped pieces representing individual wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas per BTS in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, a BTS's overall wireless coverage may not be circular, and may take on other shapes and arrangements instead.

A WCD may communicate with more than one wireless coverage area. To illustrate how this may occur, FIG. 2 includes points X and Y. While in the vicinity of point X, a WCD may be able to receive signals from wireless coverage areas of BTS 202 and BTS 204. Similarly, while in the vicinity of point Y, a WCD may be able to receive signals from wireless coverage areas of BTS 204 and BTS 206. It should be noted that, in practice, a WCD located at or near points X or Y may be able to receive signals from more than two wireless coverage areas.

In general, the depictions of both FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangements shown in FIGS. 1 and 2 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
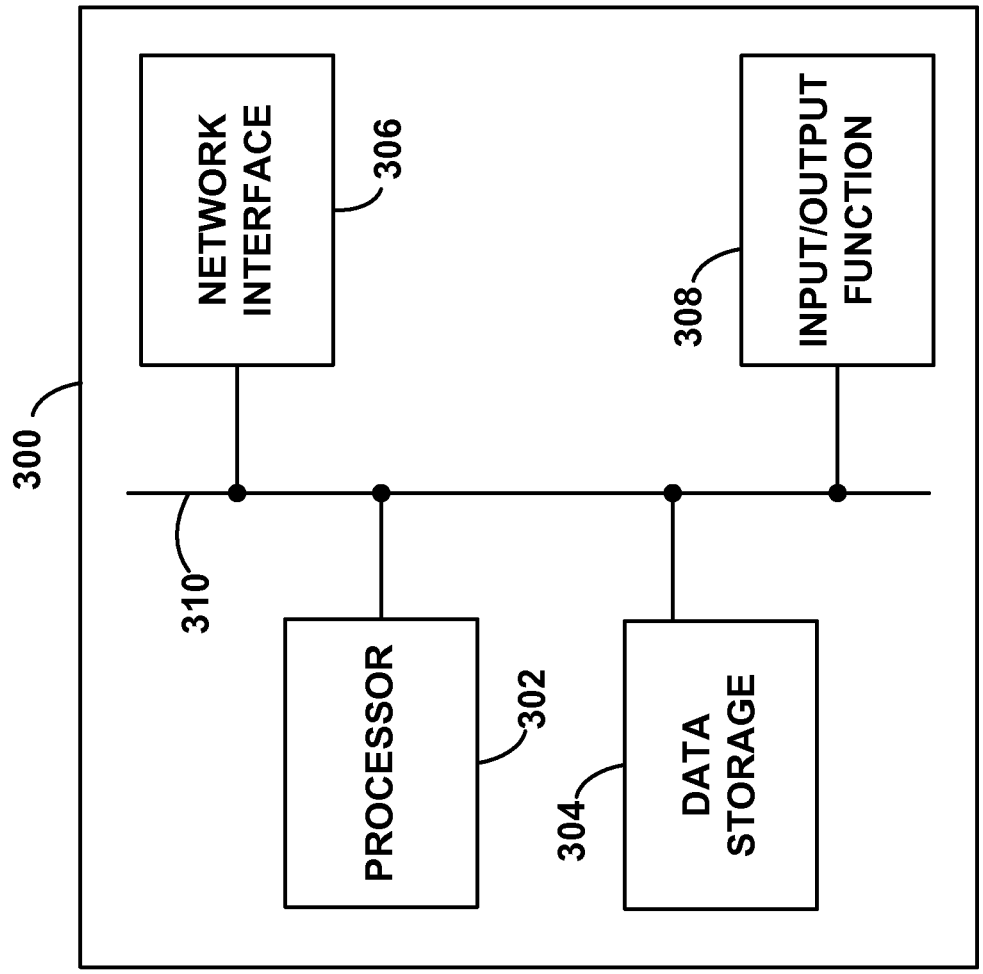
FIG. 3 is a block diagram of a RAN component, in accordance with an example embodiment.

FIG. 3 is a simplified block diagram exemplifying a RAN component 300, illustrating some of the functional elements that may be found in a RAN arranged to operate in accordance with the embodiments herein. RAN component 300 could be any type of device found in or associated with a RAN, such as a BTS, a BSC, or an MSC. For purposes of illustration, this specification may equate RAN component 300 to a BSC from time to time. Nonetheless, it should be understood that the description of RAN component 300 could apply to any component used for the purposes described herein. Thus, for example, actions attributed herein to a RAN may be carried out by one or more RAN components.

RAN component 300 may include a processor 302, a data storage 304, a network interface 306, and an input/output function 308, all of which may be coupled by a system bus 310 or a similar mechanism. Processor 302 may include one or more CPUs, such as one or more general purpose processors and/or one or more dedicated processors (e.g., application specific integrated circuits (ASICs) or digital signal processors (DSPs), etc.)

Data storage 304, in turn, may comprise volatile and/or non-volatile data storage and can be integrated in whole or in part with processor 302. Data storage 304 may store program instructions, executable by processor 302, and data that is manipulated by these instructions to carry out the various methods, processes, or functions described herein. Alternatively, these methods, processes, or functions can be defined by hardware, firmware, and/or any combination of hardware, firmware and software. Therefore, data storage 304 may be a non-transitory computer-readable medium, having stored thereon program instructions that, if executed by a computing device, cause the computing device to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example RAN component 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example RAN component 300 may support remote access from another device, via network interface 306 or via another interface (not shown), such an RS-232 or Universal Serial Bus (USB) port.

It should be understood that RAN component 300 may include multiple individual RAN functions. For instance, a BSC and a BTS collocated on the same physical hardware platform may be represented by RAN component 300.

II. CDMA Communications

The present invention will be described by way of example with reference to Code Division Multiple Access (CDMA) communications. However, it should be understood that the invention can apply to other families of protocols now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given CDMA code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be assigned dynamically for use as traffic channels, i.e., to carry bearer data such as email, web browsing, voice, video, and so on. Similarly, on the reverse link, one or more offsets of a CDMA code (i.e., offsets—or masks—of a PN long code) may be reserved for defining control channels, such as access channels, and the remaining offsets may be assigned dynamically to WCDs for use as traffic channels.

a. Channel Assignment to Active WCDs

During a call, a WCD may communicate via a number of "active" wireless coverage areas at the same time. Depending on the type and/or configuration of the RAN, the number of active wireless coverage areas may be from one to six. However, more than six active wireless coverage areas may be used without departing from the scope of this invention. The WCD may maintain a list of the active wireless coverage areas, identified according to their PN offsets. This list may be referred to as the WCD's "active set."

A RAN may be arranged to transmit the same bearer data to a given WCD concurrently via some or all of the wireless coverage areas in the given WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS. (For sake of simplicity, only the term "soft handoff" will be used in the following discussion.)

In addition to its active set, the WCD may maintain a list of "candidate" wireless coverage areas (typically up to six, but more is possible), which includes wireless coverage areas that are not in the WCD's active set but that have sufficient signal strength such that the WCD could demodulate signals from those wireless coverage areas. Further, the WCD may maintain a list of "neighbor" wireless coverage areas that are not in its active set or candidate set, but in close vicinity to the WCD and deemed by the RAN to be wireless coverage areas that the WCD should monitor for eligibility as candidate wireless coverage areas. Other wireless coverage areas that are not in the WCD's active set, candidate set, or neighbor set may be members of a "remaining" set.

To facilitate a determination of which wireless coverage areas should be in the WCD's active and candidate sets, each BTS may emit a pilot channel signal per each wireless coverage area the respective BTS defines. The WCD may constantly, or from time to time, measure the strength of each pilot channel signal that it receives and may notify the RAN when a received pilot strength is above or below designated thresholds. This notification may take the form of the WCD transmitting a pilot strength measurement message (PSMM) to the RAN indicating the strength(s) at which the WCD receives signal(s) from of one or more wireless coverage areas.

Possibly in response to receiving the PSMM, the BTS may transmit one or more handoff direction messages (HDMs) to the WCD. Each HDM may be transmitted via a different wireless coverage area in the WCD's active set, and may indicate (i) the PN offsets of the wireless coverage areas in the WCD's active set, and (ii) the following handoff parameters that relate to pilot signal strength:

T_ADD: Threshold pilot strength for addition to the active set (e.g., −14 decibels (dB))

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The WCD may then monitor the pilot signals that it receives, measuring signal strength for each as $E_c/I_o$, where $E_c$ is energy per CDMA chip for the pilot signal of a given wireless coverage area and $I_o$ is the total power received. Values of $E_c/I_o$ may range from 0 dB (very good signal strength) to −16 dB (very poor signal strength). It should be understood that $E_c/I_o$ measures a signal-to-noise ratio, but other methods of measuring signal strength, as well as other ranges of signal strength values, may be used.

If the pilot signal strength of any neighbor wireless coverage area exceeds T_ADD, the WCD may add the pilot to its "candidate" set, and transmit a PSMM to the BSC with information indicative of the identity of the wireless coverage area. If the pilot strength exceeds any active wireless coverage area signal by T_COMP, the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new wireless coverage area to its active set is a soft handoff.

If the WCD detects that the signal strength of a pilot channel in its active set drops below T_DROP, the WCD starts a handoff drop timer. If T_TDROP passes without this signal strength exceeding T_DROP, the WCD may transmit a PSMM to the BSC, indicating the wireless coverage area and the detected $E_c/I_o$. The BSC may then respond by transmitting an HDM to the WCD, without the wireless coverage area in the active set. The WCD may then receive the HDM and responsively move the wireless coverage area to its neighbor set and transmit an HCM to the BSC.

In this way, while the WCD is actively communicating (e.g., transmitting and/or receiving bearer data), the WCD may be receiving such communications from more than one wireless coverage area. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly.

b. Channel Assignment for Idle WCDs

When idle (i.e., not exchanging bearer data with the RAN), the WCD may register with a primary wireless coverage area, and listen to the paging channel of the primary wireless coverage area for incoming call indications, and other information, from the RAN. The RAN may transmit system parameter messages and/or neighbor list update messages to the WCD via this primary paging channel. These messages may contain PN offsets of the pilot channels emitted by BTSs that define neighboring wireless coverage areas (e.g., wireless coverage areas defined by the RAN's BTSs or wireless coverage areas defined by nearby BTSs in different RANs). Similar to an active WCD, an idle WCD may measure the pilot channel signal strength that it receives from each of these neighboring wireless coverage areas.

If, for some period of time, WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and register with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD seeks to engage in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD. Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message.

Once the traffic channel is assigned, the WCD may use it for exchanging bearer traffic with the RAN. In the forward direction, the RAN may encode each transmission according to the PN offset of the wireless coverage area and the Walsh code for the assigned traffic channel. In the reverse direction, the WCD may transmit bearer data to the RAN by applying the WCD's assigned PN long code offset to a PN long code, and then modulate the bearer data according to the resulting point in the PN long code.

c. Channel Assignment Message Flow

For purposes of simplicity, it is assumed herein that a "channel assignment message" is any type of message that can assign a traffic channel to a WCD. For instance, in CDMA networks, a RAN can assign a traffic channel to a WCD via either an HDM, a "channel assignment message" (CAM) or an "enhanced channel assignment message" (ECAM). The channel assignment messages described herein include any of these types of messages, as well as any other message used for the same or a similar purpose.

Control messages, such as channel assignment messages, exchanged between a WCD and the RAN may be lost or damaged due to distortion, interference, or attenuation on the air interface of the primary wireless coverage area. If such a message is lost, damaged, or otherwise not properly received by a WCD, the WCD may be unable to process the message, and the RAN may retransmit the message one or more times. However, there is no guarantee that the WCD will receive any of these retransmissions. Thus, in the presence of air interface distortion, interference, or attenuation, channel assignment may fail to take place.

In order to mitigate such occurrences, the RAN may transmit multiple channel assignment messages to the WCD. In some embodiments, the RAN transmits each channel assignment message via a different wireless coverage area. Thus, the RAN may transmit several channel assignment messages, perhaps one via the primary wireless coverage area, and one or more via nearby wireless coverage areas. Each channel assignment message may contain the same or similar channel assignment information.

Figure 4:
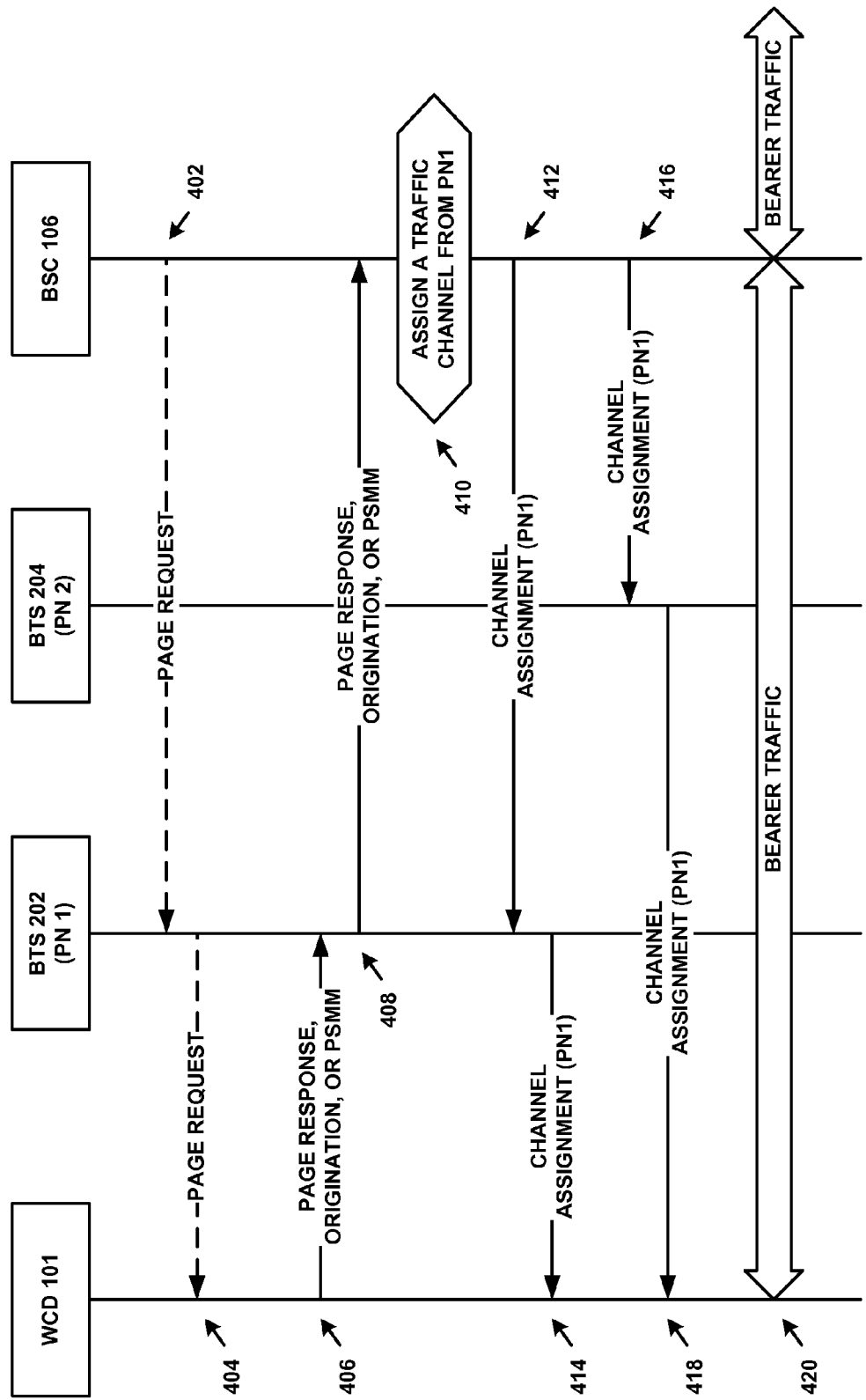
FIG. 4 is a message flow, in accordance with an example embodiment.

For purposes of illustration, FIG. 4 shows an example message flow 400 of a RAN transmitting channel assignment messages via multiple wireless coverage areas. FIG. 4 involves WCD 101, BTS 202, BTS 204, and BSC 106. BTS 202 defines a wireless coverage area with PN offset 1 ("PN 1"), and BTS 204 defines another wireless coverage area with PN offset 2 ("PN 2"). To be clear, PN 1 and PN 2 are shorthand notation for wireless coverage areas having PN offset 1 and PN offset 2 as their respective PN offsets.

BTS 202 and BTS 204 are controlled by BSC 106. WCD 101 may be able to receive pilot channel signals of sufficient strength from both PN 1 and PN 2 such that WCD could communicate via either of these wireless coverage areas. Without loss of generality, it is assumed that PN 2 is the primary wireless coverage area of WCD 101.

Preferably, WCD 101 reports, to BSC 106, measurements of the signal strengths at which WCD 101 receives the pilot channels of PN 1 and PN 2. This reporting may occur through the transmission of radio environment reports, PSMMs, or via a different type of message.

Steps 402 and 404 illustrate BSC 106, via BTS 202, transmitting an optional page request message to WCD 101. Such a page request message may be transmitted when WCD 101 is paged to answer an incoming voice call or to receive incoming data. Typically, WCD 101 would be paged when WCD 101 is idle. Accordingly, steps 402 and 404 may be omitted when WCD 101 is active.

Steps 406 and 408 illustrate WCD 101 transmitting a message via BTS 202 to BSC 106. This message may be a page response message transmitted on the access channel in response to the optional page request message. Alternatively, this message may be an origination message, also transmitted on the access channel, with which WCD 101 attempts to establish an outgoing voice or data call. This message could also be a PSMM, transmitted while WCD 101 is active. Additional alternative message types may also be used for this purpose, and any such message may be transmitted on the access channel or another type of channel.

Regardless of whether an incoming or outgoing call is being established for WCD 101, at step 410, BSC 106 may assign a traffic channel to WCD 101. In a possible scenario, BSC 106 may assign a traffic channel from PN 1. When making the traffic channel assignment, BSC 106 may consider pilot channel signal strength measurements that it received from WCD 101. BSC 106 may use these received signal strengths, and/or other information, when determining from which wireless coverage area to assign a traffic channel. Thus, if BSC 106 determines that WCD 101 receives the pilot signal from PN 2 at a lower strength than that of PN 1, BSC 106 may instead assign a traffic channel from PN 1 to WCD 101.

At steps 412 and 414, BSC 106 may transmit a first channel assignment message via BTS 202 to WCD 101. The first channel assignment message may include a traffic channel assignment for PN 1. In other words, the first channel assignment message may instruct WCD 101 to use a particular Walsh code with PN 1. Similarly, at steps 416 and 418, BSC 106 may transmit a second channel assignment message via BTS 204 to WCD 101. The second channel assignment message may also include a traffic channel assignment for PN 1. By transmitting multiple channel assignment messages to WCD 101, the likelihood that WCD 101 receives at least one of these messages is increased. Regardless, at step 420, WCD 101 may begin transmitting and receiving bearer traffic via BTS 202 (using PN 1).

While message flow 400 shows only two channel assignment messages transmitted to WCD 101, more or fewer channel assignment messages may be transmitted to WCD 101 without departing from the scope of the invention. Further, throughout message flow 400, the names of these messages are used for purposes of convenience and messages with other names may be used for similar purposes.

III. Delaying the Transmission of Channel Assignment Messages

In some situations, it may be beneficial for the RAN to delay the transmission of a channel assignment message. For example, suppose that WCD 101 is experiencing poor coverage from PN 2. In this case, the RAN transmitting a channel assignment message to WCD 101 immediately via PN 2 may have little benefit, as this channel assignment message may be lost or damaged in transit. But, it may be advantageous for the RAN to delay transmission of the channel assignment message.

Many WCDs are mobile devices, such as cellular phones, that can move about. Particularly, a WCD that is being used in a car, automobile, or train may be moving at a rather high rate of speed (e.g., 30 miles per hour to 70 miles per hour or more). Thus, even if the WCD is experiencing poor coverage from a wireless coverage area at one moment, some number of milliseconds or seconds later, the WCD may experience an improved level of coverage from the same wireless coverage area.

For instance, over the course of a few tens of milliseconds or seconds, the WCD may move from a first point near the edge of the wireless coverage area to a second point near the center of the wireless coverage area (e.g., closer to the BTS that defines the wireless coverage area). At the first point, the WCD is likely to receive a weak pilot signal via the wireless coverage area. However, at the second point, the WCD is likely to receive a strong pilot signal via the wireless coverage area.

If the RAN would normally transmit a channel assignment message to the WCD when the WCD is at the first point, this transmission may never reach the WCD or may be damaged when it reaches the WCD. Therefore, it may benefit the WCD for the RAN to delay this transmission for a period of time. As one possible example, the RAN may wait one second before transmitting the channel assignment message. This delay may provide the WCD with enough time reach the second point (or at least to reach a point at which the WCD receives stronger signals via the wireless coverage area). Then, channel assignment message transmissions to the WCD are more likely to arrive at the WCD undamaged.

On the other hand, if the WCD instead moves to a third point at which the WCD receives a pilot signal of the same strength, or an even weaker pilot signal, via the first wireless coverage than the WCD received at the first point, the RAN may refrain from transmitting a channel assignment message via the wireless coverage area. In this way, the RAN conserves signaling channel resources by not transmitting a channel assignment message when it is unlikely that the channel assignment message will arrive or arrive undamaged at the WCD. Thus, delaying transmission of a channel assignment message in scenarios such as those described above provides the RAN with the potential of either increasing the likelihood that the channel assignment message is properly received by a WCD, or reducing signaling channel load by refraining from transmitting the channel assignment message.

Additionally, the RAN may be capable of transmitting multiple channel assignment messages via multiple wireless coverage areas (e.g., one channel assignment message via each respective wireless coverage area in range of a particular WCD or used for communication by the particular WCD). In this case, the RAN may independently determine whether to delay transmission of each channel assignment message. Referring to FIG. 4 for purposes of example, the RAN may transmit a channel assignment message via PN 1 without delay, but transmit a channel assignment message via PN 2 with a particular delay. Alternatively, the RAN may transmit a channel assignment message via PN 1 with a particular delay, but transmit a channel assignment message via PN 2 with the same or a different delay. The determination of whether to delay transmission of the channel assignment message for a wireless coverage area may be based on, for instance, the strength at which the WCD receives signals from the respective wireless coverage area.

Each of these embodiments may be carried out on a per-wireless-coverage-area basis. The RAN may determine, independently for each wireless coverage area with which the RAN communicates with the WCD, whether to delay a channel assignment message transmitted via that wireless coverage area. Alternatively, the RAN may condition this determination on whether channel assignment messages were transmitted without delay in other wireless coverage areas. For instance, if the RAN is communicating with a WCD via just one wireless coverage area, the RAN may transmit channel assignment messages to the WCD via that wireless coverage area without delay regardless of the coverage quality the WCD receives from that wireless coverage area. However, suppose that the RAN is communicating with the WCD via two or more wireless coverage areas. If the RAN transmits a channel assignment message to the WCD without delay via at least one of these wireless coverage areas, the RAN may delay channel assignment message transmissions to the WCD via one or more of the other wireless coverage areas in accordance with the above embodiments.

Figure 5:
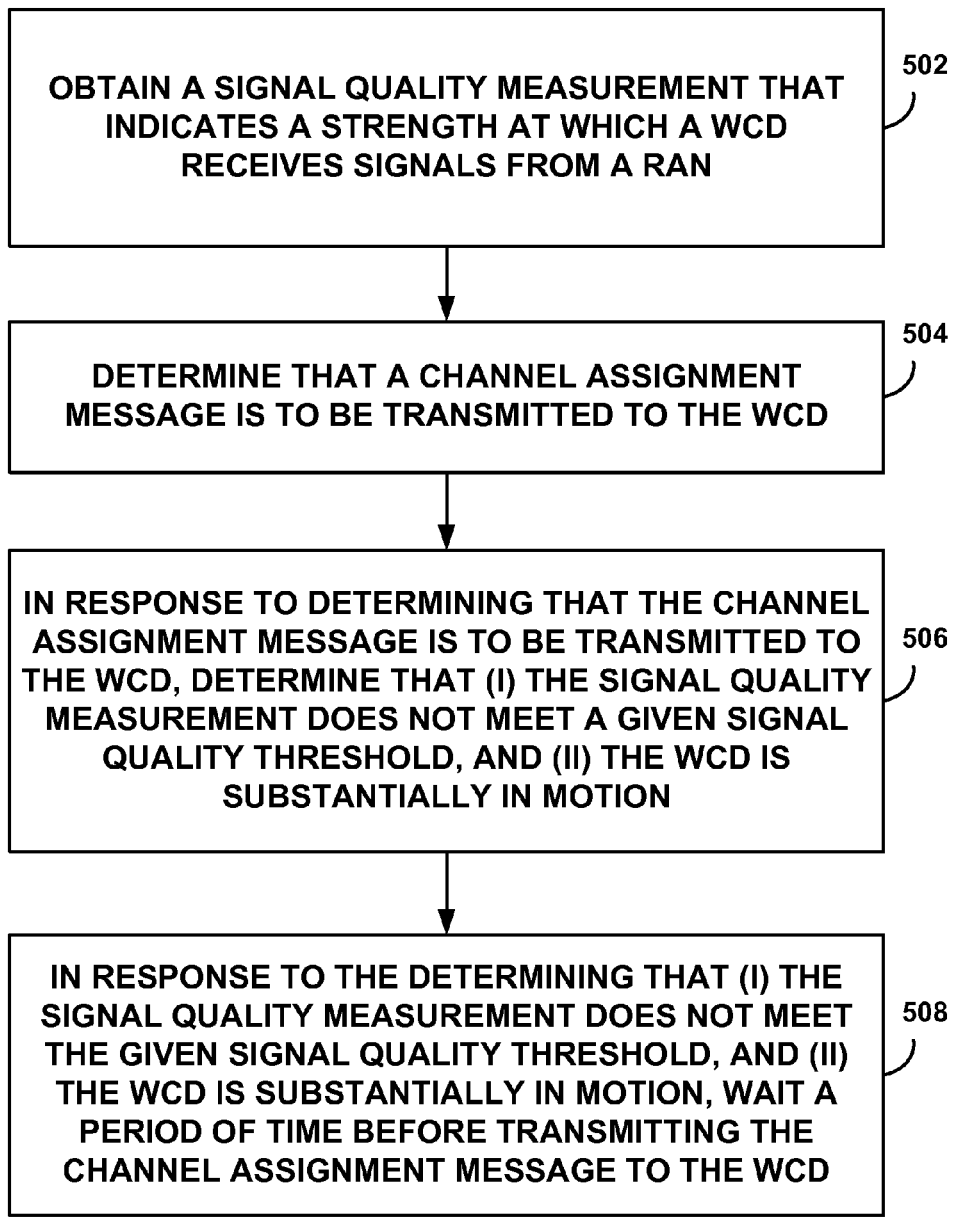
FIG. 5 is a flow chart, in accordance with an example embodiment.
Figure 6A:
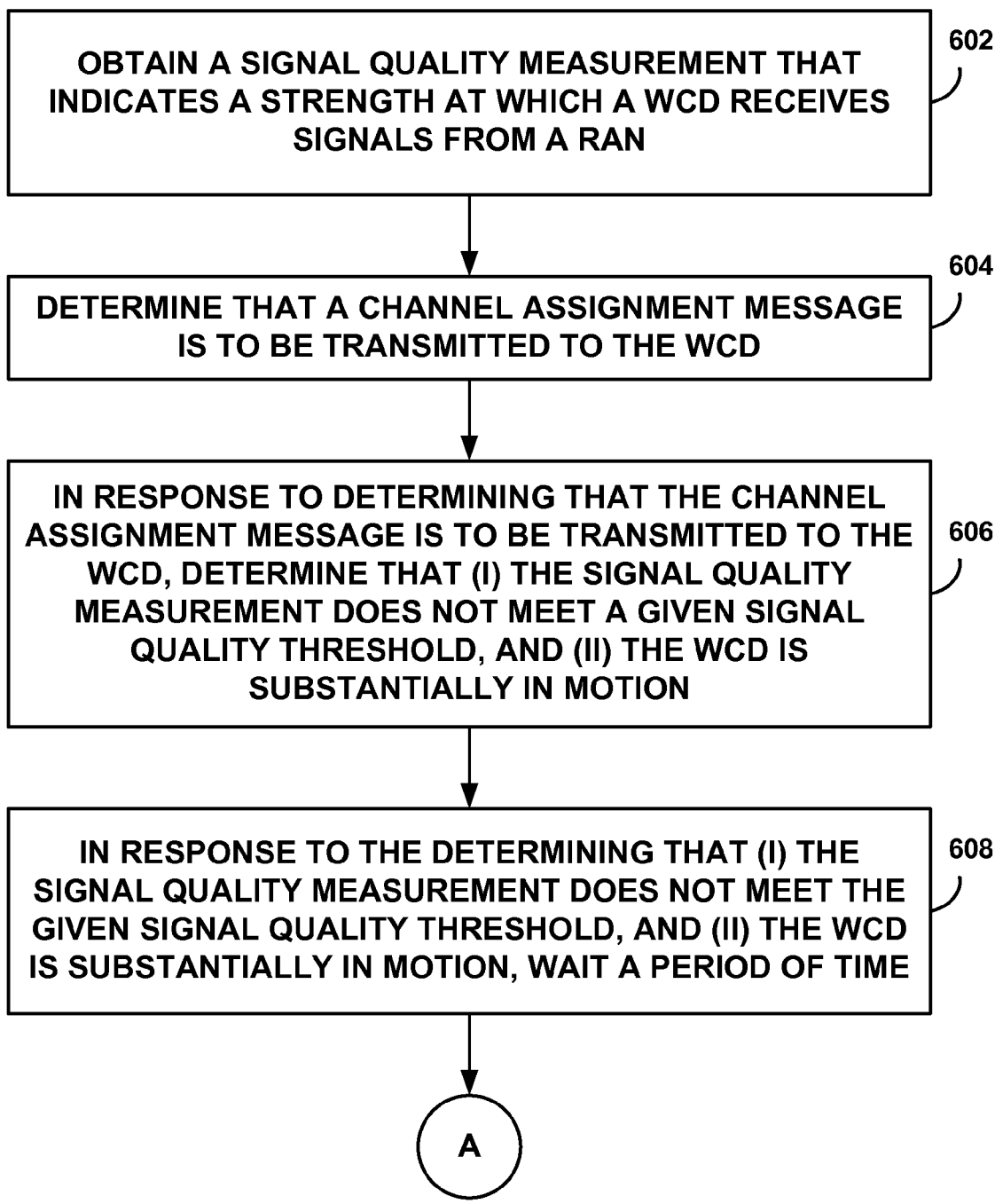
FIGS. 6A and 6B provide another flow chart in accordance with an example embodiment.
Figure 6B:
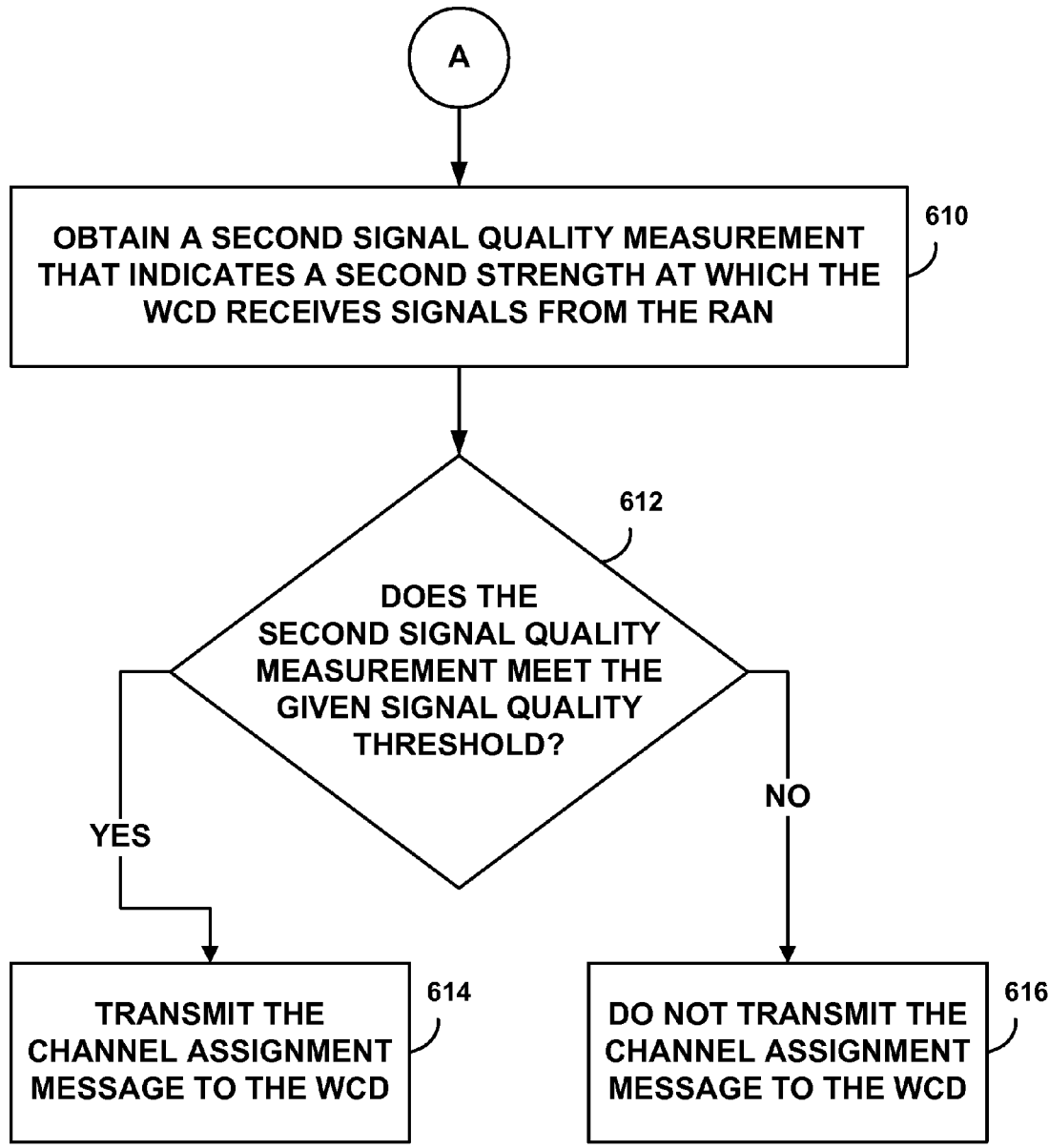

FIGS. 5, 6A, and 6B provide example embodiments through which a RAN may delay transmission of, or avoid transmitting, a traffic channel assignment message. At step 502 of FIG. 5, a RAN may obtain a signal quality measurement that indicates a strength at which a WCD receives signals from the RAN. At step 504, the RAN may determine that a channel assignment message is to be transmitted to the WCD. At step 506, in response to determining that the channel assignment message is to be transmitted to the WCD, the RAN may determine whether (i) the signal quality measurement meets a given signal quality threshold, and (ii) the WCD is substantially in motion. At step 508, in response to the determining that (i) the signal quality measurement does not meet the given signal quality threshold, and (ii) the WCD is substantially in motion, the RAN may wait a period of time before transmitting the channel assignment message to the WCD.

Waiting the period of time before transmitting the channel assignment message to the WCD may involve obtaining a second signal quality measurement that indicates a second strength at which the WCD receives signals from the RAN. After the period of time has elapsed, the RAN may determine that the second signal quality measurement meets the given signal quality threshold. Then, based on the period of time having elapsed and the second signal quality measurement meeting the given signal quality threshold, the RAN may transmit the channel assignment message to the WCD.

FIGS. 6A and 6B illustrate another example embodiment. At step 602 of FIG. 6A, a RAN may obtain a signal quality measurement that indicates a strength at which a WCD receives signals from the RAN. At step 604, the RAN may determine that a channel assignment message is to be transmitted to the WCD. At step 606, in response to determining that the channel assignment message is to be transmitted to the WCD, the RAN may determine whether (i) the signal quality measurement does not meet a given signal quality threshold, and (ii) the WCD is substantially in motion.

At step 608, in response to the determining that (i) the signal quality measurement does not meet the given signal quality threshold, and (ii) the WCD is substantially in motion, the RAN may wait a period of time. Turning to step 610 of FIG. 6B, after the period of time has elapsed, the RAN may obtain a second signal quality measurement that indicates a second strength at which the WCD receives signals from the RAN. At step 612, the RAN may determine whether the second signal quality measurement meets the given signal quality measurement. If the second signal quality measurement meets the given signal quality threshold, at step 614 the RAN may transmit the channel assignment message to the WCD. However, if the second signal quality measurement does not meet the given signal quality threshold, at step 616 the RAN may refrain from transmitting the channel assignment message to the WCD.

Both the embodiment of FIG. 5, as well as the embodiment of FIGS. 6A and 6B, may be modified and/or enhanced in various ways. For instance, the period of time may take on any reasonable non-negative value. In some embodiments, the period of time may be between 10 milliseconds and 10 seconds. In other embodiments, the period of time may be between 1 second and 5 seconds. However, the period of time should not be limited to these ranges, and may take on shorter or longer values. Further, the RAN may determine the period of time randomly. Such a random determination may involve the RAN determining the period of time according to a particular probability distribution, or some combination of probability distributions.

The signal quality measurements obtained in steps 502, 602 and 610 may be based on physical distances between the RAN and the WCD instead of or in additional to the strengths of signals that the WCD receives from the RAN. For example, the WCD may periodically, or from time to time, determine its location and send an indication of the determined location to the RAN. The location may be determined by global positioning satellite (GPS) technology, triangulation of signals the WCD receives from two or more BTSs, or some other mechanism. The RAN may compare this location to that of the WCD's serving BTS to determine the physical distance between the WCD and the BTS.

Further, the same or similar location-determining technology may be used to determine whether the WCD is substantially in motion. For instance, in one or more messages, the WCD may transmit, to the RAN, two or more determined recent locations of the WCD. If the two or more locations are substantially the same, then the RAN may consider the WCD not to be substantially in motion. However, if the two or more locations are not substantially the same, then the RAN may consider the WCD to be substantially in motion. For purposes of example, the RAN may consider two or more locations to be substantially the same if there is no more than a given distance (e.g., a few meters) between each pair of the locations.

Additionally, determining that the WCD is substantially in motion may also involve calculating a velocity of the WCD based on the two or more location measurements, and determining that the calculated velocity of the WCD exceeds a given velocity threshold. In some embodiments, the period of time may be based on the calculated velocity. For instance, the period of time may be inversely related to the calculated velocity. Thus, the greater the calculated velocity, the shorter the period of time, and vice versa. In this way, if the WCD is moving with a high velocity, the RAN may delay transmission of the channel assignment message a shorter period of time because the WCD's received signal quality is likely to change more quickly. However, if the WCD is moving with a low velocity, the RAN may delay transmission of the channel assignment message a longer period of time because the WCD's received signal quality is likely to change more slowly.

TABLE 1

Basing the channel assignment message transmission delay on the calculated velocity of the WCD.

| Calculated Velocity (in miles per hour) of the WCD (x) | Channel Assignment Message Transmission Delay (seconds) |
| --- | --- |
| x > 60 | 0.1 |
| 60 ≧ x > 40 | 0.5 |
| 40 ≧ x > 20 | 1 |
| 20 ≧ x > 10 | 2 |
| 10 ≧ x | 3 |

Table 1 illustrates one possible mapping of calculated WCD velocities to channel assignment message transmission delays. It should be understood that different mappings also fall within the scope of the invention. According to Table 1, if the calculated velocity of the WCD is greater than 60 miles per hour (MPH), the RAN delays transmission of the channel assignment message by 0.1 seconds. If the calculated velocity of the WCD is less than or equal to 60 MPH but greater than 40 MPH, the RAN delays transmission of the channel assignment message by 0.5 seconds. If the calculated velocity of the WCD is less than or equal to 40 MPH but greater than 20 MPH, the RAN delays transmission of the channel assignment message by 1 second. If the calculated velocity of the WCD is less than or equal to 20 MPH but greater than 10 MPH, the RAN delays transmission of the channel assignment message by 2 seconds. If the calculated velocity of the WCD is less than or equal to 10 MPH, the RAN delays transmission of the channel assignment message by 3 seconds.

Alternatively or additionally, determining that the WCD is substantially in motion may involve determining that the WCD has been handed off at least once recently. For example, if the WCD has been handed off in the previous minute, then the RAN may determine that the WCD is substantially in motion. In other embodiments, the RAN may determine that the WCD is substantially in motion based on the WCD being handed off in the previous 1 second, 10 seconds, 30 seconds, 2 minutes, and so on. In additional embodiments, the RAN may consider a WCD to be substantially in motion if the WCD has been handed off at least x times in the previous y seconds. The RAN may collect this handoff information from the RAN's BSC(s), BTS(s), or from another RAN.

It should be understood that the flow charts of FIGS. 5, 6A, and 6B are non-limiting embodiments. Thus, more or fewer steps than shown in FIGS. 5, 6A, and 6B may be used without departing from the scope of the invention. Additionally, any of these steps may be repeated one or more times, or may be omitted altogether. Moreover, these steps may occur in a different order than shown in FIGS. 5, 6A, and 6B. Further, these flow charts may be combined with one another, in whole or in part, also without departing from the scope of the invention.

IV. CONCLUSION

Example embodiments have been described above. Those skilled in the art will understand, however, that changes and modifications may be made to these embodiments without departing from the true scope and spirit of the invention, which is defined by the claims.

What is claimed is:

1. A method comprising:
   a radio access network (RAN) obtaining a signal quality measurement that indicates a strength at which a wireless communication device (WCD) receives signals from the RAN;
   the RAN determining that a channel assignment message is to be transmitted to the WCD;
   in response to determining that the channel assignment message is to be transmitted to the WCD, the RAN further determining whether (i) the signal quality measurement does not meet a given signal quality threshold, and (ii) the WCD is substantially in motion; and
   in response to the determining that (i) the signal quality measurement does not meet the given signal quality threshold, and (ii) the WCD is substantially in motion, the RAN waiting a period of time before transmitting the channel assignment message to the WCD, wherein the period of time is between 10 milliseconds and 10 seconds.

2. The method of claim 1, wherein the period of time is between 1 second and 5 seconds.

3. The method of claim 1, wherein the channel assignment message is transmitted via a given wireless coverage area, and wherein the RAN waiting the period of time before transmitting the channel assignment message to the WCD also occurs in response to the RAN transmitting at least one other channel assignment message to the WCD via another wireless coverage area.

4. The method of claim 1, wherein the signal quality measurement is based on a physical distance between the RAN and the WCD.

5. The method of claim 1, wherein determining that the WCD is substantially in motion comprises receiving two location measurements of the WCD, wherein the two location measurements indicate different locations.

6. The method of claim 5, wherein determining that the WCD is substantially in motion also comprises (i) calculating a velocity of the WCD based on the two location measurements, and (ii) determining that the calculated velocity of the WCD exceeds a given velocity threshold.

7. The method of claim 6, wherein the period of time is based on the calculated velocity.

8. The method of claim 1, wherein determining that the WCD is substantially in motion comprises determining that the WCD has been handed off at least once in a most recent minute.

9. The method of claim 1, wherein waiting the period of time before transmitting the channel assignment message to the WCD comprises:
   obtaining a second signal quality measurement that indicates a second strength at which the WCD receives signals from the RAN; and
   after the period of time has elapsed, determining that the second signal quality measurement meets the given signal quality threshold; and
   based on (i) the period of time having elapsed and (ii) the second signal quality measurement meeting the given signal quality threshold, transmitting the channel assignment message to the WCD.

10. An article of manufacture including a non-transitory computer-readable medium, having stored thereon program instructions that, if executed by a radio access network (RAN), cause the RAN to perform operations comprising:
    obtaining a signal quality measurement that indicates a strength at which a wireless communication device (WCD) receives signals from the RAN;
    determining that a channel assignment message is to be transmitted to the WCD;
    in response to determining that the channel assignment message is to be transmitted to the WCD, further determining whether (i) the signal quality measurement does not meet a given signal quality threshold, and (ii) the WCD is substantially in motion; and
    in response to the determining that (i) the signal quality measurement does not meet the given signal quality threshold, and (ii) the WCD is substantially in motion, waiting a period of time before transmitting the channel assignment message to the WCD, wherein the period of time is between 10 milliseconds and 10 seconds.

11. The article of manufacture of claim 10, wherein the period of time is between 1 second and 5 seconds.

12. The article of manufacture of claim 10, wherein the channel assignment message is transmitted via a given wireless coverage area, and wherein the RAN waiting the period of time before transmitting the channel assignment message to the WCD also occurs in response to the RAN transmitting at least one other channel assignment message to the WCD via another wireless coverage area.

13. The article of manufacture of claim 10, wherein the signal quality measurement is based on a physical distance between the RAN and the WCD.

14. The article of manufacture of claim 10, wherein determining that the WCD is substantially in motion comprises receiving two location measurements of the WCD, wherein the two location measurements indicate different locations.

15. The article of manufacture of claim 14, wherein determining that the WCD is substantially in motion also comprises (i) calculating a velocity of the WCD based on the two location measurements, and (ii) determining that the calculated velocity of the WCD exceeds a given velocity threshold.

16. The article of manufacture of claim 15, wherein the period of time is based on the calculated velocity.

17. The article of manufacture of claim 10, wherein waiting the period of time before transmitting the channel assignment message to the WCD comprises:
- obtaining a second signal quality measurement that indicates a second strength at which the WCD receives signals from the RAN; and
- after the period of time has elapsed, determining that the second signal quality measurement meets the given signal quality threshold; and
- based on (i) the period of time having elapsed and (ii) the second signal quality measurement meeting the given signal quality threshold, transmitting the channel assignment message to the WCD.

18. A method comprising:
- a radio access network (RAN) obtaining a signal quality measurement that indicates a strength at which a wireless communication device (WCD) receives signals from the RAN;
- the RAN determining that a channel assignment message is to be transmitted to the WCD;
- in response to determining that the channel assignment message is to be transmitted to the WCD, the RAN further determining whether (i) the signal quality measurement does not meet a given signal quality threshold, and (ii) the WCD is substantially in motion;
- in response to the determining that (i) the signal quality measurement does not meet the given signal quality threshold, and (ii) the WCD is substantially in motion, the RAN waiting a period of time, wherein the period of time is between 10 milliseconds and 10 seconds; and
- after the period of time has elapsed, the RAN (i) obtaining a second signal quality measurement that indicates a second strength at which the WCD receives signals from the RAN, (ii) if the second signal quality measurement meets the given signal quality threshold, transmitting the channel assignment message to the WCD, and (iii) if the second signal quality measurement does not meet the given signal quality threshold, refraining from transmitting the channel assignment message to the WCD.

\* \* \* \* \*